(12) United States Patent
Meyers

(10) Patent No.: US 7,251,788 B2
(45) Date of Patent: Jul. 31, 2007

(54) SIMULATED SPEED-OF-LIGHT DELAY FOR RECREATIONAL BENEFIT APPLICATIONS

(75) Inventor: Stephen Meyers, Los Angeles, CA (US)

(73) Assignee: Nokia Corporation, Espoo (FI)

( * ) Notice: Subject to any disclaimer, the term of this patent is extended or adjusted under 35 U.S.C. 154(b) by 416 days.

(21) Appl. No.: 09/747,218

(22) Filed: Dec. 21, 2000

(65) Prior Publication Data

US 2002/0082936 A1  Jun. 27, 2002

(51) Int. Cl.
G06F 3/048 (2006.01)
(52) U.S. Cl. .................... 715/799; 345/2.1; 463/42
(58) Field of Classification Search .............. 463/1, 463/30, 42, 40; 342/457; 370/466; 379/201.01, 379/207.3, 207.12; 455/419; 709/205; 715/799; 345/2.1
See application file for complete search history.

(56) References Cited

U.S. PATENT DOCUMENTS

| | | | | |
|---|---|---|---|---|
| 5,588,139 A * | 12/1996 | Lanier et al. | .................. | 703/1 |
| 5,618,043 A * | 4/1997 | McGlew | ...................... | 273/308 |
| 5,659,691 A * | 8/1997 | Durward et al. | ............ | 715/757 |
| 5,736,982 A * | 4/1998 | Suzuki et al. | ................ | 715/706 |
| 5,820,463 A * | 10/1998 | O'Callaghan | ................ | 463/42 |
| 5,838,973 A * | 11/1998 | Carpenter-Smith et al. | . | 717/105 |
| 5,890,995 A * | 4/1999 | Bobick et al. | ................. | 482/4 |
| 5,995,903 A * | 11/1999 | Smith et al. | ................ | 701/211 |
| 6,025,801 A * | 2/2000 | Beitel | ........................ | 342/457 |
| 6,085,238 A * | 7/2000 | Yuasa et al. | ................ | 709/223 |
| 6,085,256 A * | 7/2000 | Kitano et al. | ................ | 719/315 |
| 6,154,211 A * | 11/2000 | Kamachi et al. | ............. | 345/419 |
| 6,166,727 A * | 12/2000 | Kozuka | .................... | 715/500.1 |
| 6,292,198 B1 * | 9/2001 | Matsuda et al. | ............ | 345/473 |
| 6,323,857 B1 * | 11/2001 | Mielekamp et al. | ........ | 345/419 |
| 6,380,949 B2 * | 4/2002 | Thomas et al. | ............. | 715/705 |
| 6,419,577 B1 * | 7/2002 | Okada et al. | .................. | 463/1 |
| 6,463,078 B1 * | 10/2002 | Engstrom et al. | .......... | 370/466 |
| 6,487,499 B1 * | 11/2002 | Fuchs et al. | ................ | 701/213 |
| 6,553,236 B1 * | 4/2003 | Dunko et al. | ............... | 455/457 |
| 6,569,011 B1 * | 5/2003 | Lynch et al. | ................... | 463/1 |
| 6,620,043 B1 * | 9/2003 | Haseltine et al. | ............. | 463/7 |
| 6,658,258 B1 * | 12/2003 | Chen et al. | .............. | 455/456.1 |
| 6,659,861 B1 * | 12/2003 | Faris et al. | .................... | 463/1 |
| 6,665,715 B1 * | 12/2003 | Houri | ........................ | 709/223 |
| 6,677,858 B1 * | 1/2004 | Faris et al. | ............. | 340/573.1 |
| 6,729,959 B1 * | 5/2004 | Moore et al. | ................. | 463/30 |
| 6,746,332 B1 * | 6/2004 | Ing et al. | ...................... | 463/42 |
| 6,765,726 B2 * | 7/2004 | French et al. | ............... | 359/630 |
| 6,903,001 B2 * | 6/2005 | Bhattacharyya et al. | .... | 438/622 |

(Continued)

OTHER PUBLICATIONS

Richard Parry, "Position reporting with APRS", QST, Jun. 1997, vol. 81, Iss. 6, p. 60, 4 pgs. (6 sheets).*

Primary Examiner—Andrew Joseph Rudy
(74) Attorney, Agent, or Firm—Alston & Bird LLP

(57) ABSTRACT

Recreations which simulate space travel with space communication simulate the communication delays that would inhere at space distances. Recreation-related communications are passed through a store-and-forward server in which they are stored before forwarding for a time interval which simulates the communication delay that would inhere between points at the simulated spatial locations of the parties. Methods are provided for discouraging the parties from circumventing the simulated delay by communicating through means other than the store-and-forward server.

16 Claims, 3 Drawing Sheets

U.S. PATENT DOCUMENTS 6,954,906 B1 * 10/2005 Kamachi et al. ............ 715/799
6,972,786 B1 * 12/2005 Ludwig ................... 348/14.11
7,211,000 B2 * 5/2007 Jutzi et al. .................... 463/40

* cited by examiner

US 7,251,788 B2

SIMULATED SPEED-OF-LIGHT DELAY FOR RECREATIONAL BENEFIT APPLICATIONS

BACKGROUND OF THE INVENTION

1. Field of the Invention

The present invention relates to computer-based recreational benefit applications, and particularly to simulating communication delays at simulated spatial positions.

2. Description of the Related Art

The advent of the computer age has brought about not only a revolution in getting work done, but has concomitantly enabled a proliferation of recreation applications in which the simulation and graphic abilities of computers are relied upon to produce the illusion of environments and situations that would be difficult or impossible to reach in reality. Many computer users have gravitated toward extensive participation in computer-based recreations. The proliferation of Internet connections has led to recreations in which parties may engage opponents some distance from them, even around the Earth from them. The proliferation of mobile terminals further increases participation in computer-based recreations—a person on a train on his evening commute home from work in Paris might participate in a recreational activity with another person on her morning commute in San Francisco. Such interaction fosters association between people from different countries and with varying interests, who otherwise might never meet. However, many consider association with people in one's own community to be preferable to association with far-flung people.

Some action-based recreational games tend to enforce play with local opponents for the simple reason that transmission time to distant opponents takes perceptible time. If two opponents are located antipodally on the earth (for example, a party in Istanbul against a party in Honolulu) connected by a medium such as the Internet, a theoretical minimum transmission time is on the order of 500 ms. Although this time is considerably greater than the time it would take light (and therefore an electrical signal) to travel halfway around the earth, other factors such as buffering and circuit switching also contribute to the theoretical minimum. Actual transmission time is typically greater than the theoretical minimum because of such factors as indirect signal paths and multiple bufferings associated with multi-hop transmissions. Such a transmission delay would not significantly affect turn-based recreations but may be detrimental to rapid-action recreations.

Many of the popular computer-based recreations simulate space-travel environments, for example a class of recreations often referred to as space trading simulations, in which parties compete for resources by virtually buying and selling them, fighting simulated battles for them, and so forth. These recreations generally ignore a problem that would occur in reality—that travel and communication over vast distances take significant amounts of time. Many believe the recreations could be more interesting if they included the realism of these significant amounts of time.

A number of users have become more or less addicted to playing computer-based recreations, and tend to get engrossed in them to the detriment of other aspects of work and of life. A system which encourages a slower method of interaction might permit such users to reduce their concentration on recreation playing.

Users may connect to a network at a different speeds. Some users may still be using older, slower telephone line modems, such as 28.8 kbps modems and even 14.4 kbps modems. Some may use more modern 56 kbps telephone line modems. Some users may have much faster connections, such as integrated subscriber digital network (ISDN) lines, digital subscriber line (DSL) connections, T1 lines, cable modems, or direct wireless (satellite) reception. A typical message is of such size that connection speed substantially affects the time required for transmission. In an environment where rapid receipt of messages is important, such as in an action-based recreation, a party who rapidly receives recreation-related messages may have a substantial advantage over a party who receives them more slowly. There is thus a need to equalize transmission times to parties connected to a network at different transmission speeds so that all receive messages at substantially the same time.

SUMMARY OF THE INVENTION

To overcome limitations in the prior art described above, and to overcome other limitations that will become apparent upon reading and understanding the present specification, the present invention discloses a system, method, and apparatus for simulating message delivery delay over a virtual distance between parties participating in recreational benefit applications.

One embodiment of the invention provides a method of simulating communication delays among parties at simulated spatial positions, comprising the steps of: (a) receiving a message from a transmitting party, the message indicating a destination party to whom the message is destined; (b) determining a virtual distance from the transmitting party to the destination party; (c) storing the message for a time interval determined according to the determined virtual distance from the transmitting party to the destination party at a predetermined transmission speed; and then (d) forwarding the received message to the destination party.

In an aspect of this embodiment step (b) is performed according to actual terrestrial positions of the parties; and the predetermined transmission speed is substantially less than the speed of light.

In another aspect of this embodiment step (b) is performed according to simulated positions of the parties in a virtual spatial map.

In another aspect of this embodiment step (a) includes checking said message and rejecting said message if it contains any information indicating true identity of the transmitting party.

In another aspect of this embodiment step (c) is bypassed if the transmitting party agrees to pay a premium.

In another aspect of this embodiment the parties are engaged in a recreation involving at least virtual buying and selling of goods, and wherein goods obtained from a greater simulated distance incur a greater virtual cost.

Another embodiment of the invention provides a server for simulating communication delays among parties at simulated spatial positions, comprising: an arithmetic unit for at least determining a simulated distance from each party to each other party; a receiver for receiving a message from a transmitting party; a data store for storing the received message for a time interval determined by the arithmetic unit according to the determined simulated distance from the transmitting party to a destination party and a predetermined transmission speed; and a transmitter for forwarding the received message to the destination party.

In an aspect of this embodiment the determination of a simulated distance from each party to each other party is performed according to actual terrestrial positions of the parties; and the predetermined transmission speed is substantially less than the speed of light.

In another aspect of this embodiment the determination of a simulated distance from each party to each other party is performed according to simulated positions of the parties in a virtual spatial map.

In another aspect of this embodiment the receiver checks said message and rejects said message if it contains any information indicating true identity of the transmitting party.

In another aspect of this embodiment the data store is bypassed if the transmitting party agrees to pay a premium.

In another aspect of this embodiment the parties are engaged in a recreation involving at least virtual buying and selling of goods, and goods obtained from a greater simulated distance incur a greater virtual cost.

Another embodiment of the invention provides a server for equalizing the effects of network connection speeds among parties connected to a network, comprising: a receiver for receiving a message to be sent to each party; an arithmetic unit for at least determining a transmission time for the message for each party according to each party's connection speed; and a transmitter for forwarding a copy of the received message to each party after a time inversely proportional to the transmission time determined for that party.

In an aspect of this embodiment, said time inversely proportional to the transmission time for each party is computed so that all parties receive messages at substantially the same time.

Another embodiment of the invention provides a method of equalizing the effects of network connection speeds among parties connected to a network, comprising the steps of: receiving a message to be sent to each party; determining a transmission time for the message for each party according to each party's connection speed; and transmitting a copy of the received message to each party after a time inversely proportional to the transmission time determined for that party.

An aspect of this embodiment includes the step of computing said time inversely proportional to the transmission time for each party so that all parties receive messages at substantially the same time.

Another embodiment of the invention provides a system for terminals to interact in a network recreation environment with other terminals, comprising: means for determining a terminal's location; means for linking a terminal's location to a virtual location of the network recreation; means for transmitting recreation-related messages to said other terminals; and means for adapting delivery time of messages sent from a terminal to another terminal.

In an aspect of this embodiment, the means for determining a terminal's location comprises means for inputting a name of a proximate city from a predetermined list of cities and means for equating the terminal's location to a terrestrial location of the proximate city.

In another aspect of this embodiment the means for determining a terminal's location comprises means for receiving signals from the global positioning system and means for determining the terminal's location accordingly.

In another aspect of this embodiment the means for determining a terminal's location comprises means for inputting a postal code and means for equating the terminal's location with the a predetermined terrestrial location associated with the postal code.

In another aspect of this embodiment the means for linking a terminal's location to a virtual location is according to the terminal's location and virtual distances pertaining to the network recreation.

In another aspect of this embodiment the means for transmitting recreation related messages employs at least one of the Internet, GSM, WAP, EDGE, TETRA, and Bluetooth.

In another aspect of this embodiment the means for adapting delivery time is according to the virtual location of a terminal.

In another aspect of this embodiment the means for adapting delivery time is according to a connection speed associated with a terminal.

Another embodiment of the invention comprises a system for terminals to interact, comprising: a network for connecting the terminals to one another and to a server for providing interactive content to the terminals, the server comprising: a CPU, an input interface for receiving signals via the network from the terminals and coupling them to the CPU, logic in the CPU for determining interactive content for the terminals responsive to signals received therefrom, and an output interface for forwarding interactive content via the network from the CPU to the terminals.

An aspect of this embodiment comprises a data store coupled to the CPU.

In another aspect of this embodiment, the data store contains at least: identification of terminals currently connected to the server, approximate terrestrial positions of said terminals, actual distances among said terminals determined according to their approximate terrestrial positions, virtual distances among said terminals determined according to the actual distances among them and a distance scale appropriate to a recreation in which said terminals are participating, the transmission speeds at which said terminals are connected to the network, and a queue of messages, each from a source one of said terminals and destined for a destination one of said terminals.

In another aspect of this embodiment, each message remains in the queue for a queuing time determined according to: the virtual distance between its source terminal and its destination terminal, and according to a virtual transmission speed predetermined for a recreation in which said terminals are participating.

In another aspect of this embodiment, each message remains in the queue for a queuing time determined according to: the virtual distance between its source terminal and its destination terminal, a virtual transmission speed predetermined for a recreation in which said terminals are participating, and the transmission speed of the destination terminal so as to equalize the effects of different transmission speeds.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals denote similar elements.

DETAILED DESCRIPTION OF THE PRESENTLY PREFERRED EMBODIMENTS

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

According to one embodiment of the invention, a party in a recreational game has the object of buying and selling goods in different areas of deep space and managing the actions of trading vessels which can travel to these areas. He may also manage war vessels, which requires to management of military strategies over a vast distance. According to the invention, the parties are assigned imaginary spatial locations. Such assignment could be arbitrary, or it could be determined according to predetermined rules. For example, a party's imaginary spatial location could be determined according to his terrestrial location, perhaps determined according to the GPS system or perhaps according to the user's approximate latitude and longitude, as might be obtained according to postal code or by requesting the user to specify the nearest city to him from a list of cities and assigning his latitude and longitude as those of the city selected.

Figure 1:
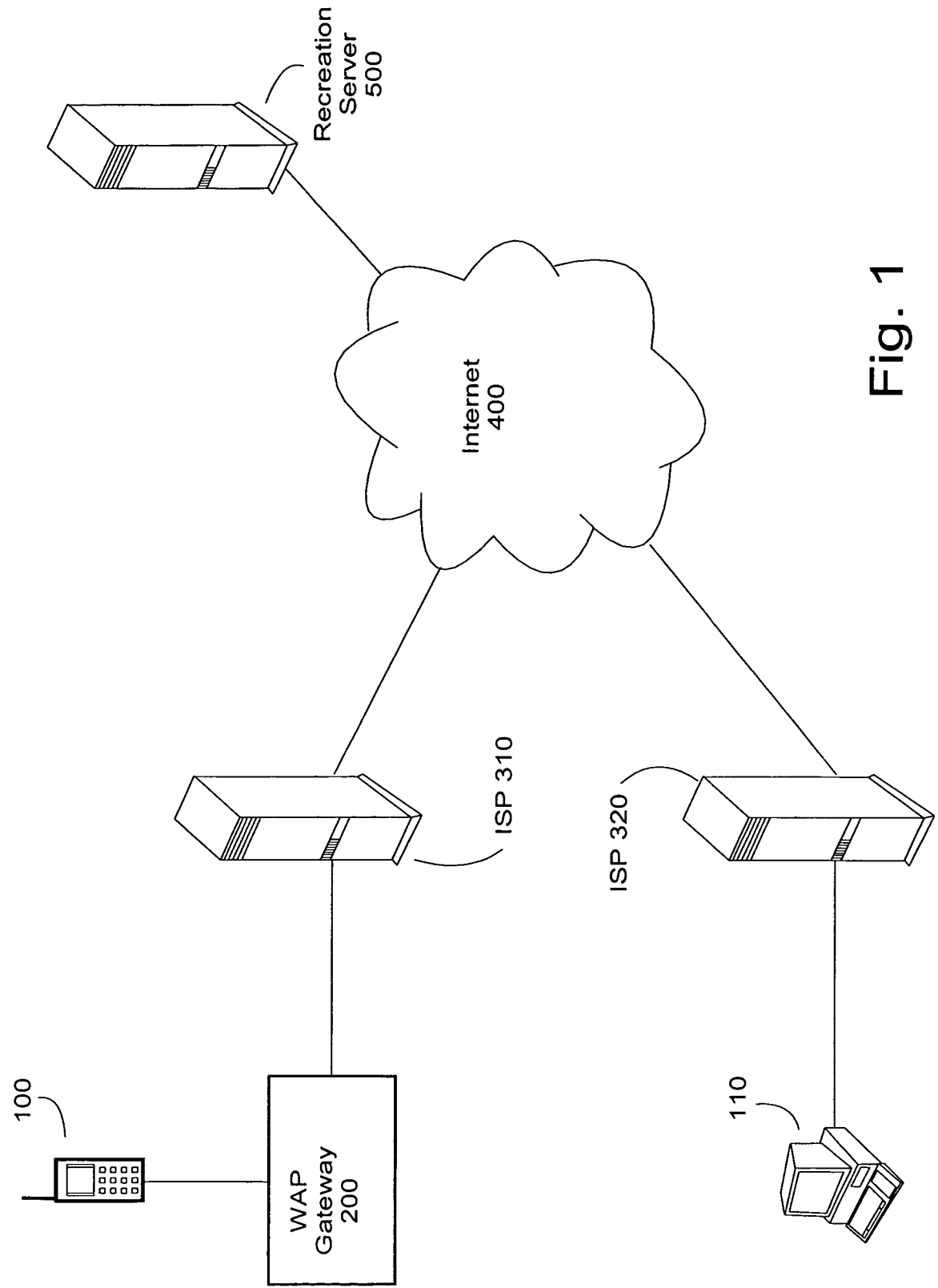
FIG. 1 is a block diagram of a system according to one embodiment the present invention, and on which the method of the present invention may be practiced.

FIG. 1 illustrates a system in which the present invention may be practiced. A large number of parties may engage in a recreation, each party equipped with a terminal device 100, 110, and so on. For simplicity FIG. 1 depicts a situation where only two parties are engaged. One is equipped with a mobile telephone 100 as a terminal device. As is known in the art, that user gains access to an Internet Service Provider (ISP) 310 through a wireless application protocol (WAP) gateway 200. The other party is equipped with a PC 110, which accesses ISP 320 by means known in the art. The parties could communicate with each other through Internet 400, or they can communicate with other network entities; for purposes of playing a recreation they would communicate with recreation server 500. Their communications to each other are processed by recreation server 500, which is a "store-and-forward" server.

According to the present invention the server 500 delays transmission according to a simulated speed of light. Since the term "speed of light" (Einstein's constant, often known as "c") is commonly used actually to mean "speed of electromagnetic radiation", which includes radio waves, there is thus a simulated speed of radio transmission from a party's simulated headquarters to his simulated fleet, and to headquarters or vessels of other parties. An example will now be considered in which the simulated speed of light is arbitrarily chosen to be 3,000 km/hour (where the actual speed of light is 300,000 km/second). When the party in Istanbul sends a message to the party in Honolulu, the simulated transmission takes approximately seven hours to travel the 20,000 km between the two antipodal locations. This simulates the actual transmission time that would be required between widely separated points in deep space. The party in Istanbul might also interact with other local parties in Istanbul, resulting in transmission times on the order of seconds. The party in Paris might interact with the party in Istanbul, with transmission times on the order of minutes.

Thus, the invention provides parties with incentive to find fellow parties who are geographically near them, encouraging building of community and face-to-face interaction. The invention fosters a slower pace of interaction, permitting modes of recreation playing which fit well into a generally active lifestyle. The use of store-and-forward messaging as an integral recreation element keep the costs of a recreation cheaper, thus permitting a subscription or advertising supported business model.

According to another embodiment of the invention, the inventive system may also be used to simulate transmission times other than deep-space radio transmission. For example, in recreations that simulate medieval battles it may be used to simulate the transmission times that prevailed when messages had to be hand-carried by messengers on foot or, at best, on horseback.

Figure 2:
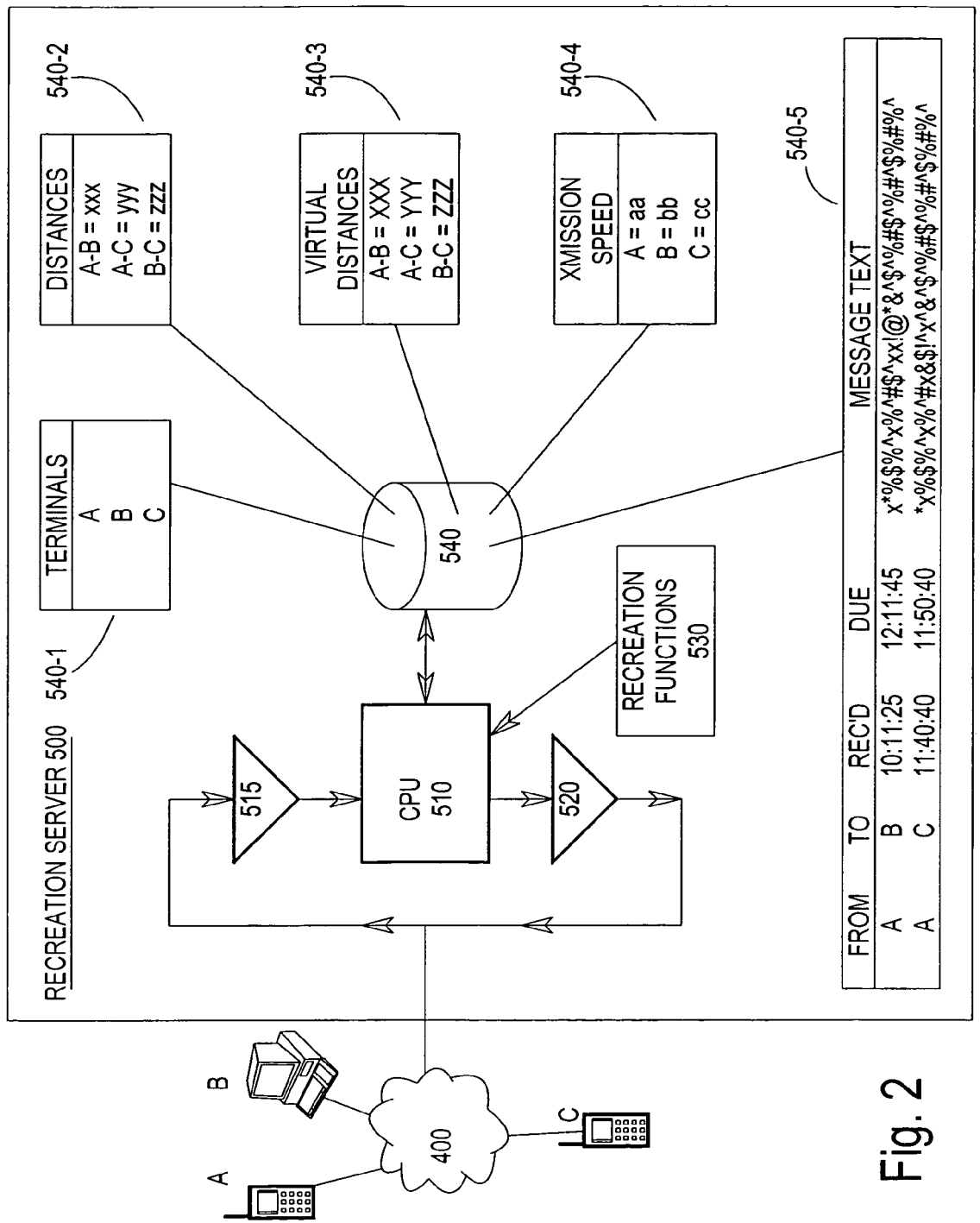
FIG. 2 is a block diagram of a server according to one embodiment of the present invention; and According to one embodiment of the invention.

FIG. 2 is a block diagram of server 500 according to one embodiment of the invention. A CPU 510 generally controls operation within server 500 and performs specific logic tasks such as determining simulated distances and simulated transmission times, under the control of, inter alia, recreation functions software 530. There is provision for connecting server 500 to internet 400, represented in FIG. 2 by receiver 515 and transmitter 520. A data store 540 contains databases in support of operations determined by recreation functions 530.

As discussed in connection with FIG. 1, a plurality of terminals may be connected via Internet 400 (probably through ISP's and various gateways, not shown in FIG. 2) to recreation server 500. Databases used in a preferred embodiment will now be discussed, although those skilled in the art will appreciate that many other configurations may be deployed. Database 540-1 stores a list of terminals currently being served by server 500, probably listed by IP address, although referred to here simply by letters of the alphabet Database 540-1 contains indications of the approximate terrestrial locations of the terminals. Database 540-2 stores a list of calculated actual distances among the terminals, determined according to approximate latitude and longitude positions of the terminals, which are in turn determined from GPS signals, identification of a nearby city, or postal code, for example. Database 540-3 stores a list of determined virtual distances among the terminals as determined according to the actual distances among the terminals and further according distances being simulated in a current recreation. Database 540-4 contains a list of transmission speeds (connection speeds) for each terminal. Database 540-5 stores current messages to and from terminals, along with information pertaining to each message, including FROM, TO, time received or originated, and calculated time for delivery ("DUE"). Transmission to the mobile terminals A and C is typically via GSM, WAP, EDGE, TETRA, or Bluetooth, for example.

One concern regarding use of the invention is that parties might choose to circumvent the inventive delay by simulating "faster than light" communications, communicating with other parties through channels that do not include the inventive server, such as email, short message service (SMS), or direct telephone conversation. For example, two parties communicating in this manner could have an unfair advantage in coordinating an attack on a third party. Ways to prevent or discourage users from "faster than light" communications include party masking, added value communication, and public communication.

In party masking, the recreations are conducted in a manner that prevents parties from communicating their real identities to one another. Text messages are scanned in the server to block those containing real names, telephone numbers, email addresses, real-world place names, and the like. The easiest approach is to require interaction in a predefined fashion using forms with predetermined menus of entries for each field, leaving the user no way to insert potentially identifying information. Parties may still attempt to find one another by advertising in public forums such as Usenet newsgroups or chat areas for parties in particular situations in particular recreations. This can be counteracted by providing the parties with different names for the same objects. For example, a trade good represented to one party as "bombs" may be represented to another as "explosives".

The method of added value communication does not forbid simulated faster than light communication, but instead permits parties to communicate in that manner but at an expense in recreation resources or in real monetary charges.

The public communication solution requires that all recreation communication take place on publicly accessible channels. This discourages parties from revealing their real-life personal details, and also removes many of the advantages of further communication.

In an alternative embodiment of the invention, the transmission delay is determined according to a nonlinear metric. For example, a function of the square root of the physical distance between parties makes long distance communication less costly, while a function of the square of the distance fosters play with local parties.

In another embodiment, the simulated distance between parties is determined according to criteria other than the geographic distance between them. The simulated distance might be based on a virtual distance within the recreation, or users might be grouped in "preference space" where users with similar likes and dislikes are grouped closer together.

In another embodiment, goods produced at far simulated distances from a party are worth more to that party than goods produced relatively close by.

Figure 3:
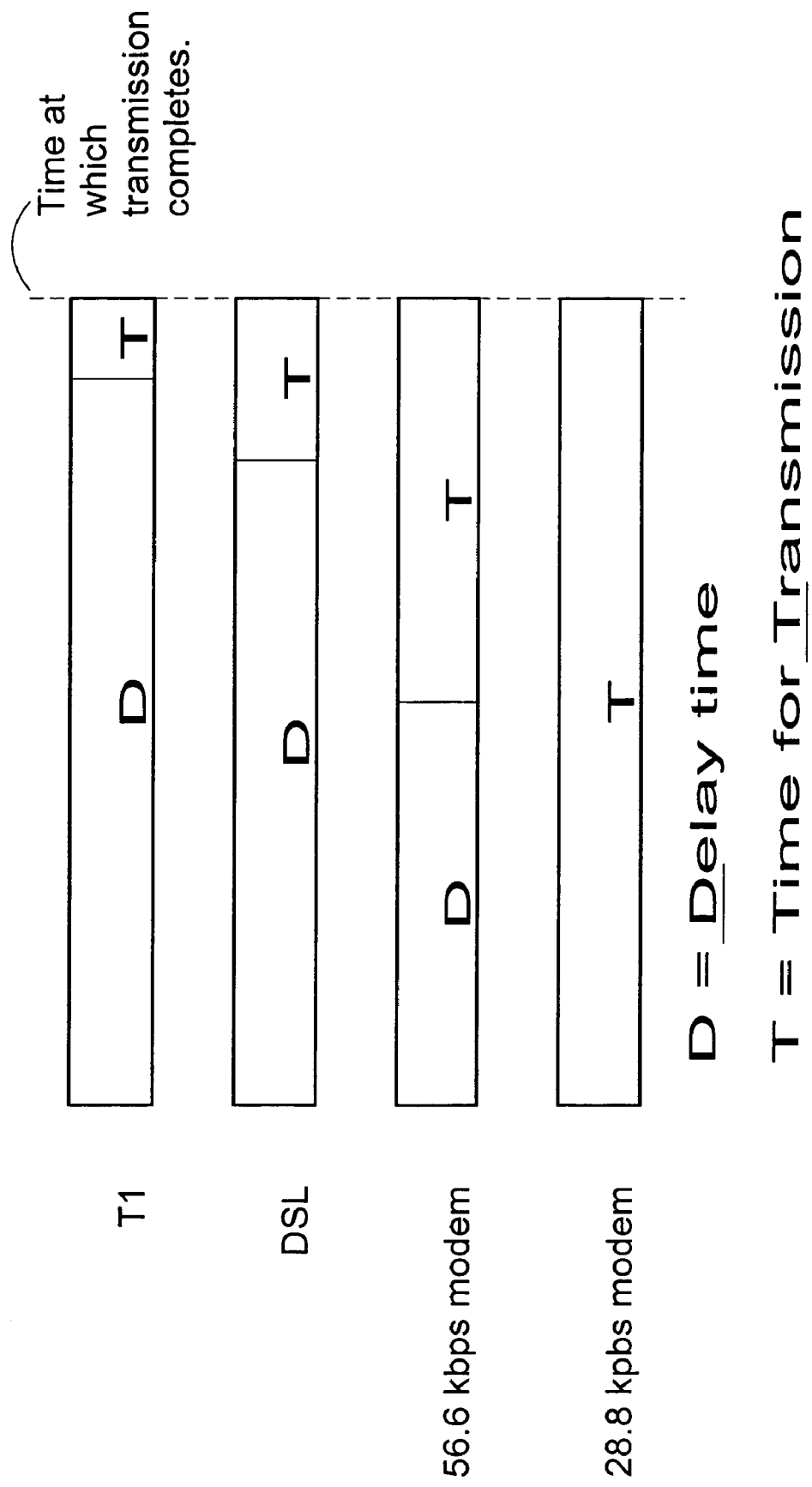
FIG. 3 illustrates a scenario in which messages for terminals connected at different speeds are delayed by proportionate amounts so that all terminals complete receiving the message at the same time.

In another embodiment, delays in server 500 are adjusted for each party so as to compensate for variations in the parties' connection speeds. For example, in a recreational rapid-action game a party with a high-speed Internet connection (such as ISDN, DSL, or cable modem) may observe action taking place well before a party with a 28.8 kbps modem sees it displayed. A method according to the invention, practiced in server 500, notes each party's connection speed (540-4 in FIG. 2) and adjusts delay time accordingly so that all parties observe action at the same rate. FIG. 3 illustrates a scenario in which a message bound for a user with 28.8 kbps modem (typically, the slowest device among an interacting group of users) is not delayed before transmission, while messages bound for users with various higher speed connections are delayed proportionately, so that transmission of the message completes at the same time for all users. (The delay discussed here is independent of any delays that are introduced to impose a simulated speed of light.)

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A system for simulating message transmission delays in a virtual recreation environment, said system comprising:
   a server configured to define the virtual recreation environment, said server being configured to connect through a communication network with a plurality of terminals, such that each of the plurality of terminals is configured to selectively interact in the virtual recreation environment with others of the plurality of terminals; and
   transmitting means for transmitting messages between first and second terminals of said plurality of terminals;
   wherein said server is further configured to associate a virtual location of the virtual recreation environment with each of the plurality of terminals and to delay transmission of messages sent between the first and second terminals by implementing a delay time based on a virtual distance between the virtual locations of the first and second terminals.

2. The system according to claim 1, wherein said server comprises a memory for storing a queue of messages, each message of the queue of messages being from a source one of the plurality of terminals and destined for a destination one of the plurality of terminals.

3. The system according to claim 2, wherein each message of the queue of messages remains in the queue for a queuing time based on the virtual distance between the source and destination terminals.

4. The system according to claim 1, wherein said server comprises means for determining an actual location for each of the plurality of terminals.

5. The system according to claim 4, wherein said determining means is configured to equate the actual location for each of the plurality of terminals to a terrestrial location of the respective proximate city.

6. The system according to claim 4, wherein said server comprises means for receiving signals from a global positioning system and said determining means is configured for determining the actual location for each of the plurality of terminals based on signals received from the global positioning system.

7. The system according to claim 4, wherein said server comprises means for inputting a postal code and said determining means is configured for equating the actual location of each of the plurality of terminals with a predetermined terrestrial location associated with the postal code.

8. The system according to claim 1, wherein said server is configured to associate the virtual location of the virtual recreation environment with each of the plurality of terminals by using an actual location for each of the plurality of terminals and virtual distances pertaining to the virtual recreation environment.

9. The system according to claim 1, wherein said server is configured to connect through the communication network using at least one of the Internet, Global System for Mobile communication, (GSM), Wireless Application Protocol (WAP), Enhanced Data for GSM Evolution (EDGE), TErrestrial TRunked RAdio (TETRA), or Bluetooth wireless technology.

10. The system according to claim 4, wherein said server associates the actual location of each of the plurality of terminals to the virtual location in the virtual recreation environment.

11. The system of claim 1, wherein said server is configured to determine a travel rate of transmission of the message in the virtual recreation environment and to implement the delay time based on the virtual distance between the virtual locations of the first and second terminals and on the travel rate of transmission of the message in the virtual recreation environment.

12. The system of claim 1, wherein said server comprises a memory storing a list of participating terminals of the plurality of terminals that are currently participating in the virtual recreation environment and associated virtual distances between each pair of the plurality of terminals.

13. The system of claim 12, wherein said memory is further configured to store transmission speeds of each of the plurality of terminals.

14. The system of claim 12, wherein said memory is further configured to store a queue of messages, each message of the queue of messages being from a source one of the plurality of terminals and destined for a destination one of the plurality of terminals.

15. A system for simulating message transmission delays in a virtual environment, comprising a server including a processor running a software program defining a virtual recreation environment, said processor being connected to a receiver and transmitter for communication with a communication network, said server being configured to connect through the communication network with a plurality of terminals for allowing each of the plurality of terminals to interact in the virtual recreation environment with others of the plurality of terminals, said software comprising computer executable steps instructing said server to:

associate each of the plurality of terminals interacting in the virtual recreation environment to a virtual location in the virtual recreation environment, transmit messages between first and second terminals of said plurality of terminals, the messages being related to the virtual recreation environment, and delay transmission of messages sent from the first terminal to the second terminal by implementing a delay time based on a virtual distance between the virtual locations of the first and second terminals.

16. A computer program product for simulating message transmission delays in a virtual environment when executed by a processor of a server defining a virtual recreation environment, the server being configured to connect through a communication network with a plurality of terminals for allowing each of the plurality of terminals to interact in the virtual recreation environment with others of the terminals, the computer program product comprising a computer-readable storage medium having computer-readable program code portions stored therein, the computer-readable program code portions comprising:

a first executable code portion for associating each of the plurality of terminals to a virtual location in the virtual recreation environment;

a second executable code portion for transmitting messages between first and second terminals of said plurality of terminals, the messages being related to the virtual recreation environment; and a third executable code portion for delaying transmission of messages sent from the first terminal to the second terminal by implementing a delay time based on a virtual distance between the virtual locations of the first and second terminals.

* * * * *